No. 870,853. PATENTED NOV. 12, 1907.
J. H. SNUGGS.
AXLE WHEEL COUPLING.
APPLICATION FILED JULY 28, 1906.
2 SHEETS—SHEET 1.
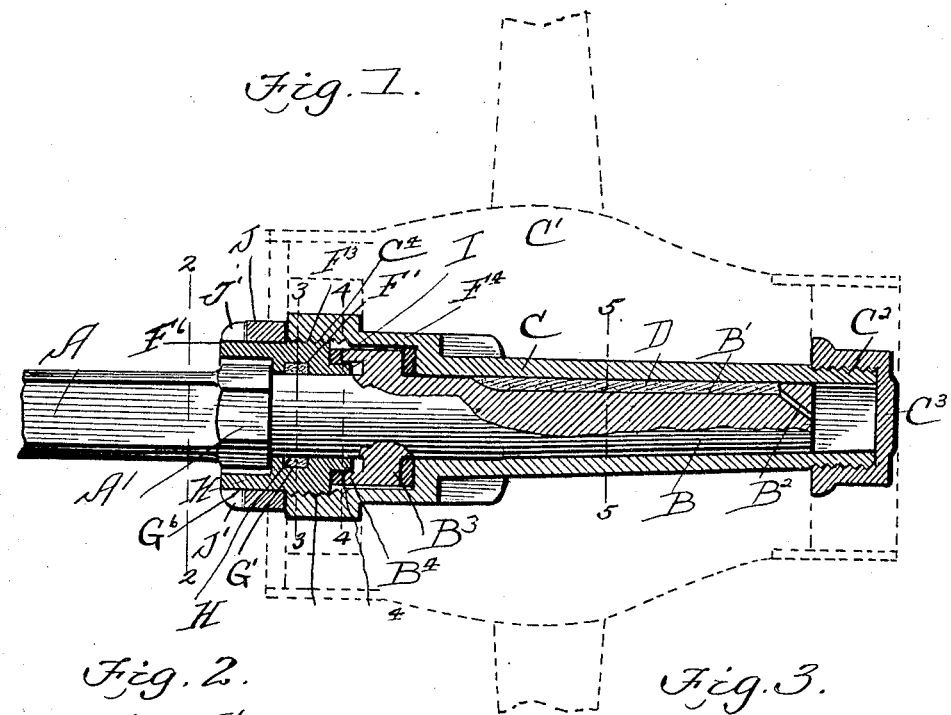
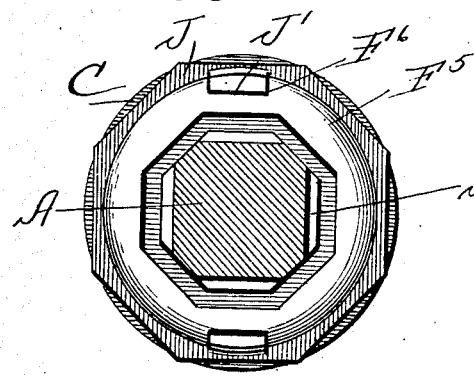
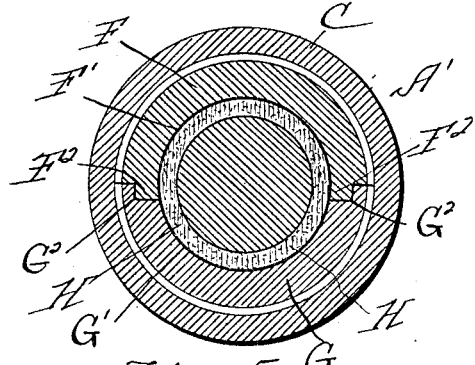
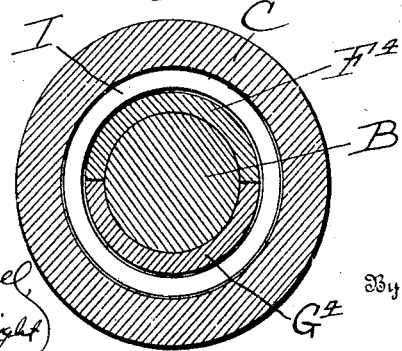
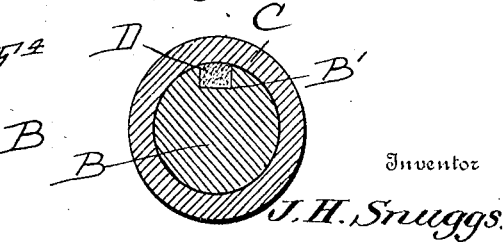
Witnesses
Inventor
J. H. Snuggs.
By
Attorneys

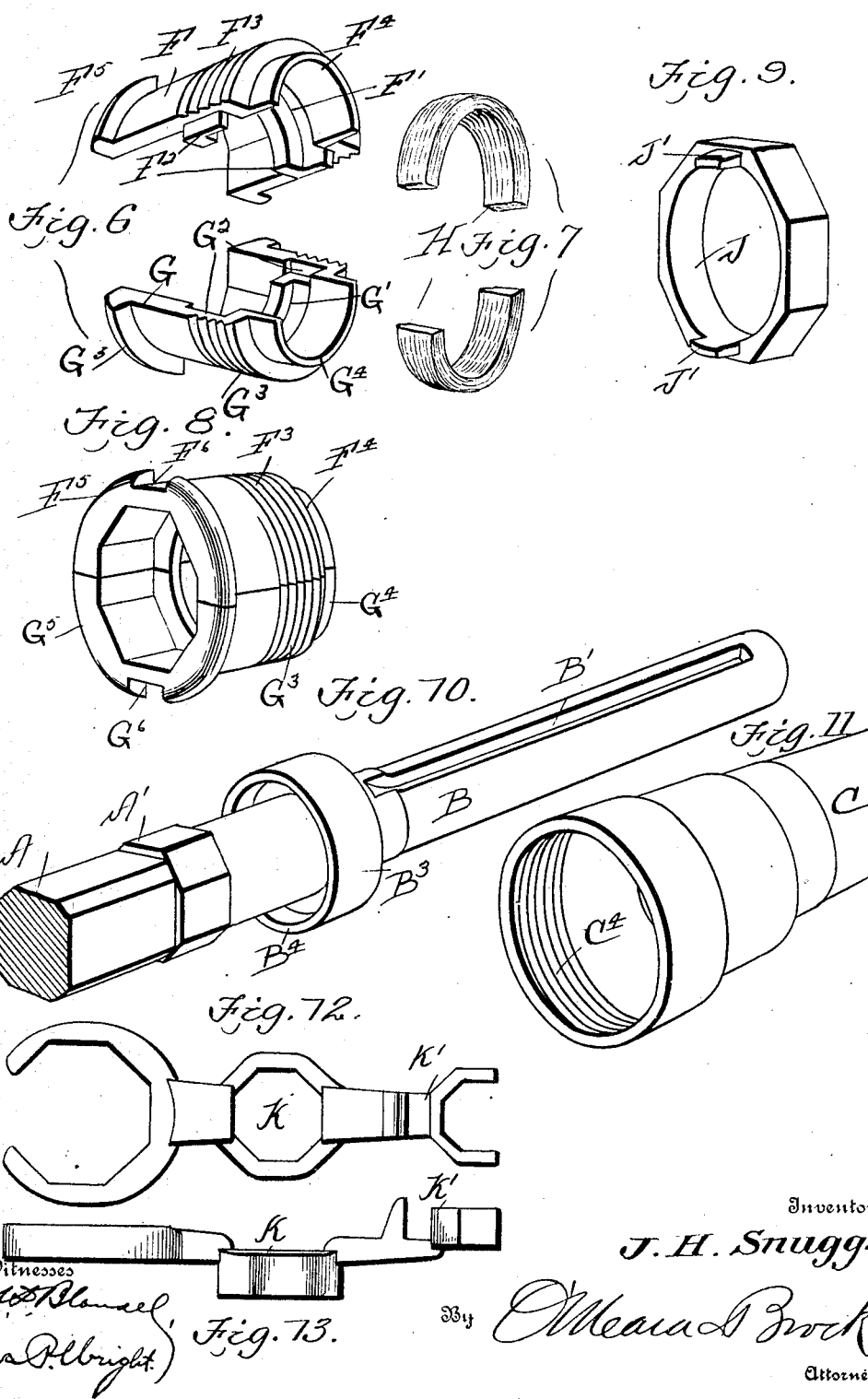

UNITED STATES PATENT OFFICE.

JOHN H. SNUGGS, OF JACKSON, MICHIGAN.

AXLE-WHEEL COUPLING.

No. 870,853.　　　　Specification of Letters Patent.　　　　Patented Nov. 12, 1907.

Application filed July 28, 1906. Serial No. 328,176.

*To all whom it may concern:*

Be it known that I, JOHN H. SNUGGS, a citizen of the United States, residing at Jackson, in the county of Jackson and State of Michigan, have invented a new and useful Improvement in an Axle-Wheel Coupler, of which the following is a specification.

This invention relates to axle box couplers and more particularly to axle wheel couplers, the object being to provide an axle so constructed that the wheel can be connected to the axle from the inside by turning the wheel.

Another object of my invention is to provide an axle coupler which is perfectly dust proof.

Another object of this invention is to provide a coupler which is very simple and cheap in construction and one in which the wheel can be readily removed by simply inserting a wrench and turning the wheel.

With these various objects in view, the invention consists in the novel features of construction, hereinafter fully described and pointed out in the claims.

In the drawings forming a part of this specification:—Figure 1 is a longitudinal sectional view of my improved wheel coupler. Fig. 2 is a section taken on lines 2—2 of Fig. 1. Fig. 3 is a section taken on lines 3—3 of Fig. 1. Fig. 4 is a section taken on lines 4—4 of Fig. 1. Fig. 5 is a section taken on lines 5—5 of Fig. 1. Fig. 6 is a perspective view of the locking nut separated. Fig. 7 is a perspective view of the packing. Fig. 8 is a perspective view of the locking nut. Fig. 9 is a perspective view of the locking sleeve. Fig. 10 is a perspective view of the axle skein. Fig. 11 is a perspective view of the axle box. Fig. 12 is a plan view of the wrench, and Fig. 13 is a side view of the wrench.

Referring to the drawings A indicates an axle having an enlarged octagonal portion A′ provided with a skein B, having a longitudinal groove B′ provided with an inclined bore B² at its outer end, extending out to the end of the skein. A collar B³ is formed on the skein provided with a flange B⁴, forming an annular recess in which is arranged a leather or rubber washer. A box C is mounted on the axle skein carrying a wheel C′ provided with a threaded outer end C², on which a nut C³, is adapted to be secured, forming a chamber in the end of the box, so that the oil from the packing D arranged in the groove B′ of the skein B, will pass into the same through the bore B², and be fed back on the axle skein the cap at the same time forming a dust proof cap for the same.

Arranged on the skein B between the collar B³, and enlarged octagonal portion A′, is a split nut formed of two sections F and G having annular grooves F′, G′ in which the sectional packing washers H are adapted to fit. The section F is provided with outwardly projecting lugs F², adapted to fit in recesses G², formed in the section G. The sections are provided with threaded portions F³, G³, and outwardly projecting tongues F⁴, G⁴, on which a washer I is adapted to be placed, the end of the tongues fitting in the recess of the collar against the packing washer arranged therein, when the threaded portions are screwed into the internally threaded ends C⁴, of the box C. Flanges F⁵, G⁵, are formed on the other end of the section provided with notches F⁶, G⁶, in which the tongues J′, of a tapering sleeve J are adapted to fit and draw the sections securely together, when it is forced up on the same by being engaged by the end of the box. The sleeve is provided with an octagonal nut receiving portion. The ends of the sections are recessed so as to form an octagonal recess when inserted around the octagonal portion A′ of the axle A so that by inserting the end K′ of the wrench K, therein, and turning the wheel it will be securely locked thereon.

From the foregoing description it will be seen that I have provided very novel means for securing the wheel on the skein so as to form a dust proof box.

Having thus fully described my invention, what I claim as new and desire to secure by Letters Patent is:—

1. The combination with an axle skein provided with a flanged collar, the flanges of the collar extending inwardly, of a split nut arranged on said skein provided with tongues fitting under the flange of the collar, said nut being provided with an annular groove, a packing washer arranged in said groove, and a box arranged over said skein secured to said nut.

2. The combination with an axle skein provided with a flanged collar, of a split nut arranged on the skein provided with tongues arranged under the flange of the collar a box secured on said skein by said nut, and means for locking the sections of the nut together for the purpose described.

3. The combination with an axle skein provided with a collar, of a split nut arranged on said skein bearing against said collar, a box provided with a threaded end adapted to fit on said nut, and a sleeve arranged on said nut for the purpose described.

4. The combination with an axle skein provided with a flanged collar, of a split nut arranged on said skein provided with outwardly projecting tongues fitting under said flanged collar, a sleeve arranged on said nut and a box arranged on said skein provided with a threaded end working on said nut, for the purpose described.

5. The combination with an axle having an octagonal enlargement provided with an axle skein, having a collar formed thereon, of a split nut arranged on said skein adjacent said collar provided with an octagonal recess a box having an internally threaded end fitting on said nut, and a sleeve mounted on said nut for the purpose described.

6. The combination with an axle provided with an axle skein having a flanged collar formed thereon, of a split nut arranged on said collar provided with tongues adapted to fit under the flange of the collar and provided with annular groove, a packing secured in said groove, a flange formed on said nut having notches formed therein, a sleeve arranged on said nut provided with tongues fitting in said notches, and a box arranged on said skein having an internally threaded end working on said nut adapted to engage said sleeve, for the purpose described.

7. The combination with an axle skein, provided with a flanged collar, of a nut provided with tongues fitting under the flange of the collar, a flange formed on said nut provided with notches, a tapering sleeve fitting over said nut provided with tongues fitting in the notches of the flange, and a box working on said nut adapted to engage said sleeve, for the purpose described.

JOHN H. SNUGGS.

Witnesses:
ALVIN PHILLIPS,
FRED HIRSCHMAN.